US008033501B2

(12) United States Patent
Callahan et al.

(10) Patent No.: US 8,033,501 B2
(45) Date of Patent: Oct. 11, 2011

(54) METHOD AND APPARATUS FOR ATTACHING ELECTRICALLY POWERED SEAT TRACK COVER TO THROUGH HOLE SEAT TRACK DESIGN

(75) Inventors: Kevin S. Callahan, Shoreline, WA (US); Bradley J. Mitchell, Snohomish, WA (US); Trevor M Laib, Woodinville, WA (US); James E. Ebner, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 1887 days.

(21) Appl. No.: 11/150,578

(22) Filed: Jun. 10, 2005

(65) Prior Publication Data

US 2007/0018045 A1 Jan. 25, 2007

(51) Int. Cl.
  *B64D 11/06* (2006.01)
(52) U.S. Cl. ........ 244/118.6; 244/122 R; 439/110; 174/74 R
(58) Field of Classification Search ........ 244/132, 244/118.5–118.6, 122 R, 129.1; 174/195–198, 174/72 A, 70 C, 74 R; 410/105, 115; 411/48; 24/16, 453; 439/110, 210
See application file for complete search history.

(56) References Cited

U.S. PATENT DOCUMENTS

| 3,313,083 | A | * | 4/1967 | Flora | 24/297 |
| 4,213,593 | A | * | 7/1980 | Weik | 410/105 |
| 4,428,078 | A | | 1/1984 | Kuo | |
| 4,635,886 | A | * | 1/1987 | Santucci et al. | 24/543 |
| 4,763,360 | A | | 8/1988 | Daniels et al. | |
| 4,853,555 | A | | 8/1989 | Wheat | |
| 4,874,276 | A | * | 10/1989 | Iguchi | 24/297 |
| 4,875,871 | A | * | 10/1989 | Booty et al. | 174/72 C |
| 4,936,527 | A | * | 6/1990 | Gorges | 244/118.6 |
| 6,492,594 | B1 | * | 12/2002 | Magyar et al. | 174/97 |
| 6,513,756 | B1 | * | 2/2003 | Lambiaso | 244/118.5 |
| 6,601,798 | B2 | | 8/2003 | Cawley | |
| 2002/0144835 | A1 | * | 10/2002 | Samhammer | 174/72 A |

FOREIGN PATENT DOCUMENTS

EP 1411611 4/2004

OTHER PUBLICATIONS

Extended-European Search Report for corresponding European Application 06252904.5-2207 / 1732188 dated Feb. 4, 2011.

* cited by examiner

*Primary Examiner* — Galen Barefoot
(74) *Attorney, Agent, or Firm* — Harness, Dickey & Pierce, P.L.C.

(57) ABSTRACT

A system for communicating electrical signals between two spaced apart seat assemblies on a mobile platform, for example an aircraft. The seat assemblies are secured to seat tracks mounted on a floor of the aircraft cabin. The seat tracks have a plurality of spaced apart holes that enable seat assembly mounting. A seat track cover is snap-fit onto one or more seat track mount devices. Each of the seat track mount devices includes one or more cleats or knobs that can be snap fit into the openings in the seat track to quickly and easily secure the seat track cover to the seat track. The seat track cover and mount devices enable a simple, planar seat track having spaced apart holes to be employed, rather than a C-shaped seat mounting track.

29 Claims, 13 Drawing Sheets

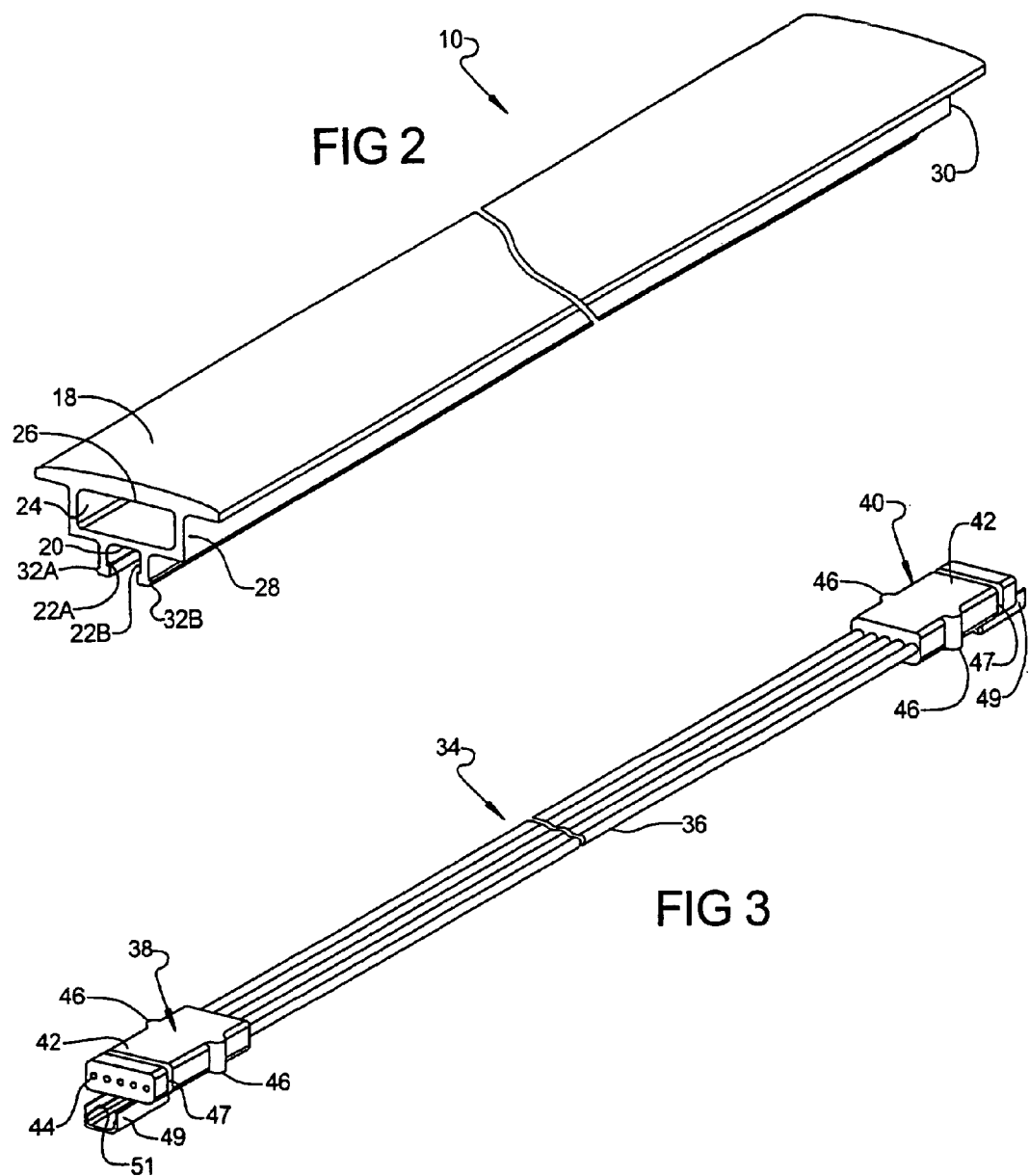

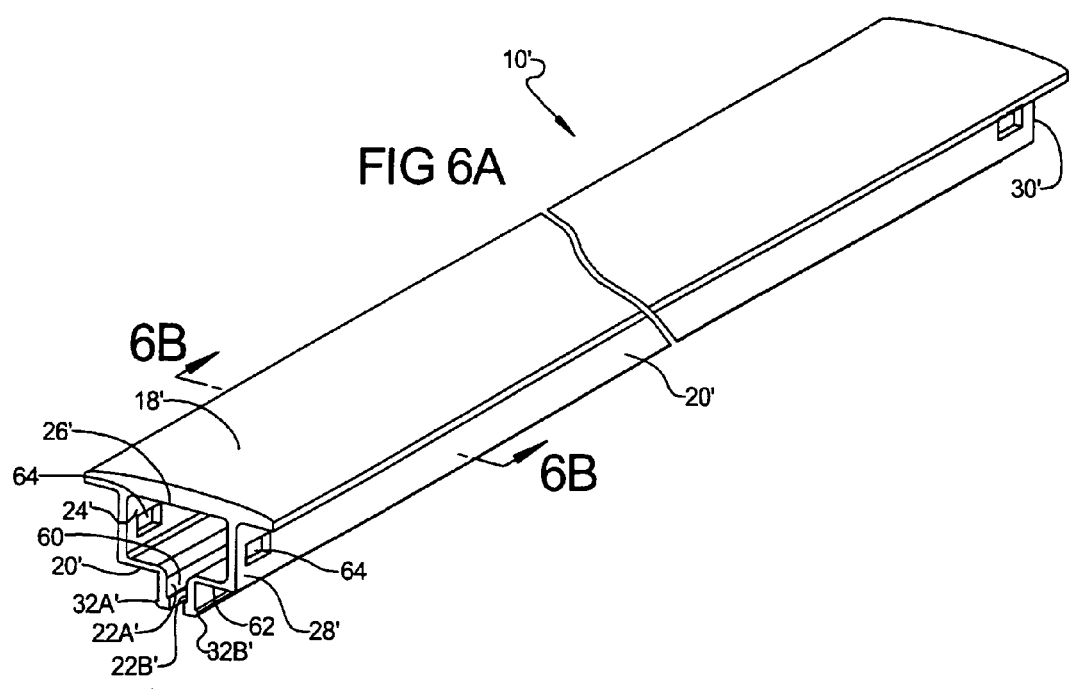
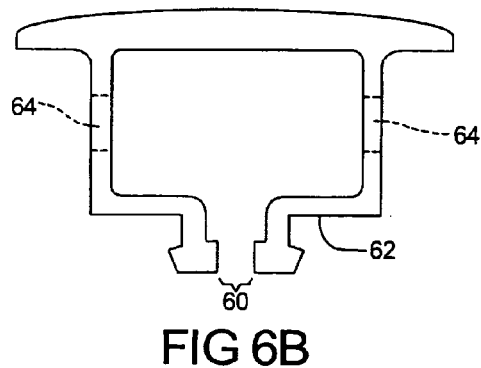

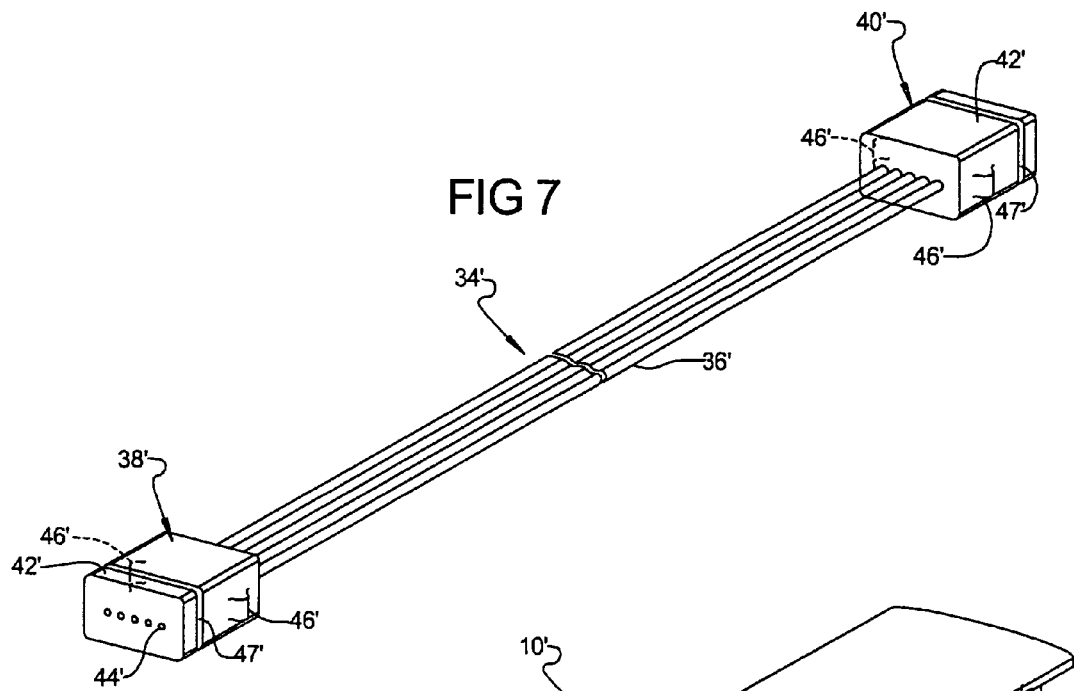
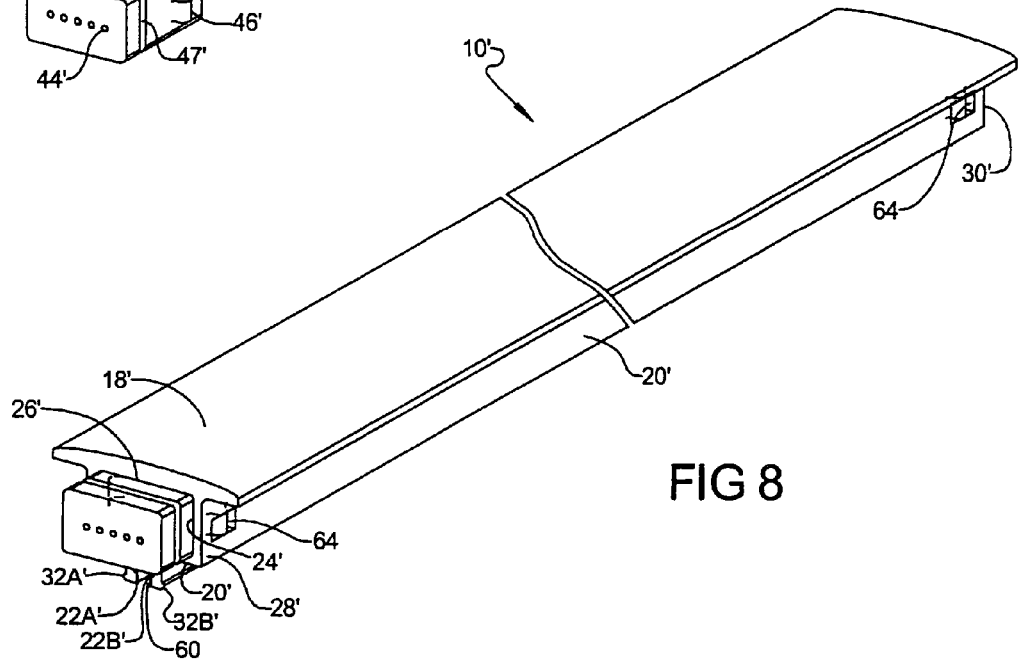

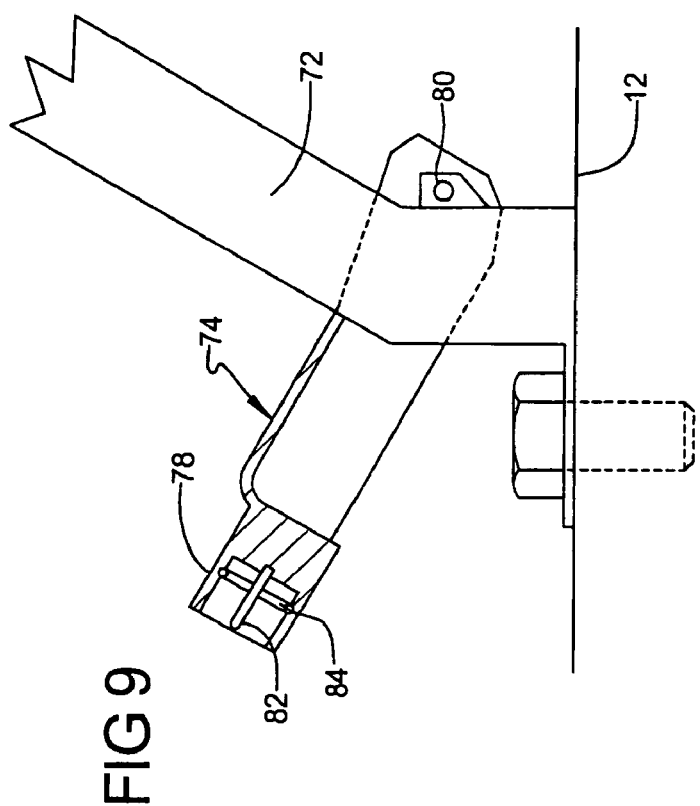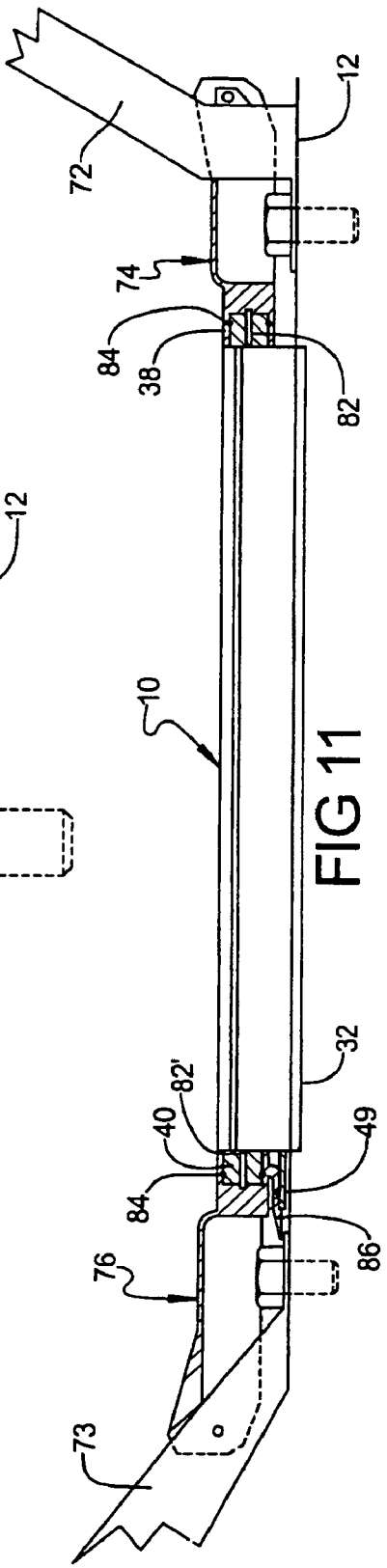

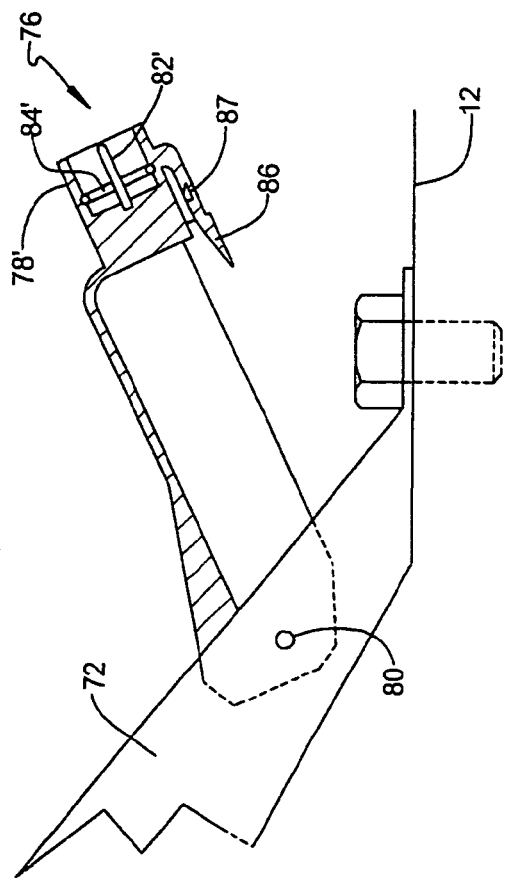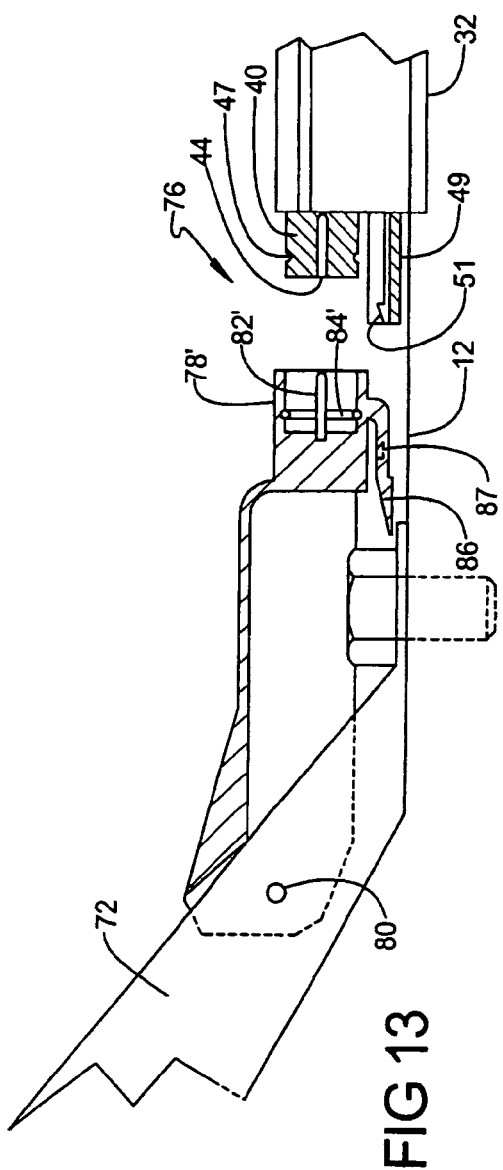

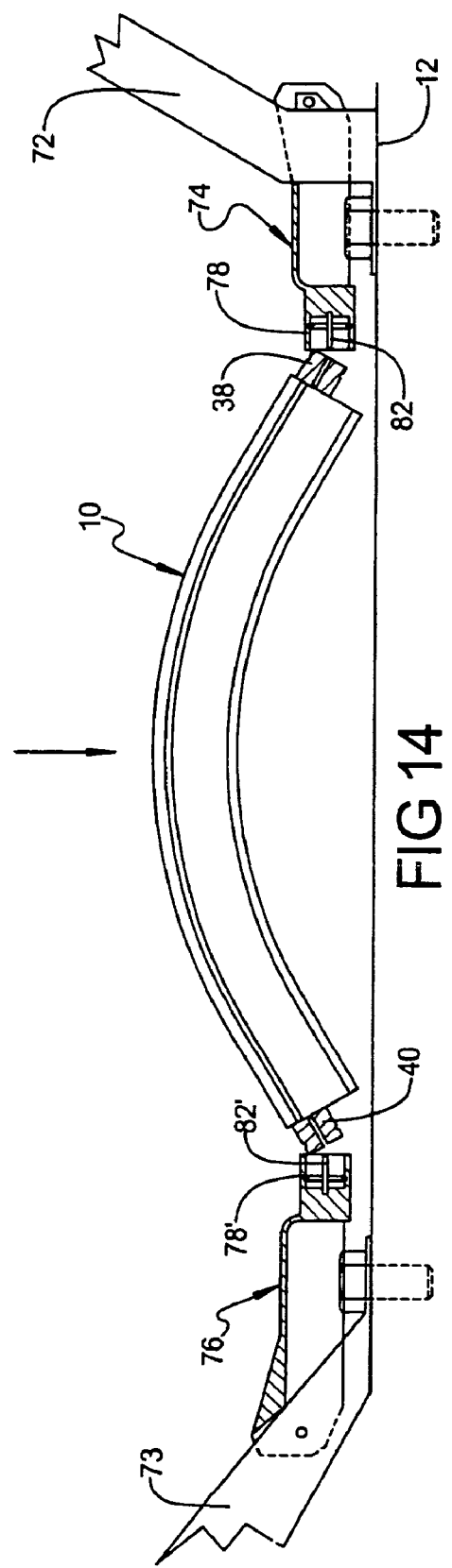

METHOD AND APPARATUS FOR ATTACHING ELECTRICALLY POWERED SEAT TRACK COVER TO THROUGH HOLE SEAT TRACK DESIGN

FIELD OF THE INVENTION

The present invention relates to mobile platform passenger seats. In particular, the present invention relates to a seat track cover that houses a cable for providing an electrical or optical connection between one or more passenger seats.

BACKGROUND OF THE INVENTION

Commercial aircraft operators and passengers are increasingly requesting in-flight entertainment (IFE) and electrical power outlets to enable passengers and/or crew members to operate various personal electronic devices, such as laptop computers, at their seats. To provide passengers and/or crew members with such features, electrical power and data communications capability must be delivered to each seat. Power and data are delivered to aircraft passenger seats via one or more cables that extend from a power or data source to the passenger seats. The cables typically extend up through a floor access panel and along one or more seat tracks recessed within the floor of the aircraft passenger cabin. The seat track is covered by a seat track cover.

The cover is typically secured directly to the seat track or to the portions of the aircraft passenger cabin floor that surround the seat track. However, in some applications the seat track is planar and does not provide a surface that will permit direct engagement with the seat track cover. Therefore, there is a need for a system for securing seat track covers to seat tracks with planar upper surfaces.

SUMMARY OF THE INVENTION

It is desirable to eliminate the need to run individual power and/or data cables to each aircraft passenger seat or seat group. The present invention provides for a seat track cover that includes one or more cables to transfer electrical power and/or data between two seats and eliminates the need to run individual cables in addition to the seat track cover to each seat or seat group. During assembly, the cover is cut to match the approximate length between the seats. At least one cable having a standard length equal to or greater than the length of the cover is inserted within the cover. A mounting device is used to secure the cover to the seat track. The mounting device is fixedly mounted to the seat track and the cover is fixedly mounted to the mounting device.

In one preferred form, the present invention provides for a system for communicating at least one of power and data between two spaced apart seat assemblies. The system comprises a seat track cover, a seat track mount, and a seat track. The seat track cover includes a first engagement detail. The seat track mount includes a second engagement detail and a third engagement detail. The seat track includes a receptacle. The first engagement detail engages the second engagement detail to secure the cover to the mount. The third engagement detail engages the seat track receptacle to secure the mount to the seat track.

The invention further provides for a system for communicating at least one of power and data between two spaced apart seat assemblies. The system includes a seat track, a seat track cover, and a seat track mount. The seat track has an opening. The seat track mount includes a base, a pair of spaced apart parallel sidewalls extending in a first direction from the base that form a "U" shaped receptacle with the base, and an engagement pin extending from the base in a second direction that is opposite to the first direction. The mount is operable to fixedly receive the seat track cover between the side walls. The engagement pin cooperates with the seat track opening to fixedly secure the mount to the seat track.

The invention still further provides for a method of mounting a seat track cover to a seat track between a first seat leg assembly and a second seat leg assembly. The method includes the following steps: sizing a seat track cover to a length that approximates a distance between the first and second seat leg assemblies; securing a seat track mount to the seat track through cooperation between a first engagement detail of a first side of the mount and a receptacle of the seat track; securing the seat track cover to a first seat leg assembly; securing the seat track cover to the seat track mount through cooperation between a second engagement detail of the seat track cover and a third engagement detail of a second side of the seat track mount that is opposite the first side of the mount; and securing the seat track cover to the second seat leg assembly to provide a connection between the first and second seat leg assemblies.

The invention also provides for a system for communicating at least one of power and data between two spaced apart seat assemblies. The system includes a seat track, a seat track cover, and a seat track mount. The seat track has an opening. The seat track mount includes a base portion, a first knob extending from a first side of the base portion, and a second knob extending from a second side of the base portion opposite the first side. The first knob cooperates with the seat track cover to secure the mount to the seat track cover. The second knob cooperates with the seat track to secure the mount to the seat track.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 2 is a side perspective view of the seat track cover of FIG. 1;

FIG. 3 is a side perspective view of a cable used with the seat track cover of FIG. 1;

FIG. 6A is a perspective view of a seat track cover according to an additional embodiment of the present invention;

FIG. 6B is a cross-sectional view taken along line 6B-6B of FIG. 6A;

FIG. 7 is a perspective view of a cable according to another embodiment of the present invention;

FIG. 8 is a perspective view of the cable of FIG. 7 installed within the seat track cover of FIG. 6A;

FIG. 9 is a side cross-sectional view of a front connector assembly of one of the seat groups of FIG. 1;

FIG. 11 is a side view, in partial cross-section, of the seat track cover of FIG. 2 installed between the front connector assembly of FIG. 9 and a rear connector assembly;

FIG. 12 is a side view of a rear connector assembly of one of the seat groups of FIG. 2;

FIG. 13 is a side cross-sectional view of the seat track cover of FIG. 2 being secured to the rear connector assembly;

FIG. 14 is a pre-installation side view of a flexible seat track cover;

FIG. 19b is a side view of the mounting peg of FIG. 19a; and

DETAILED DESCRIPTION OF THE PREFERRED EMBODIMENTS

The following description of the preferred embodiments is merely exemplary in nature and is in no way intended to limit the invention, its application, or uses.

Figure 1:
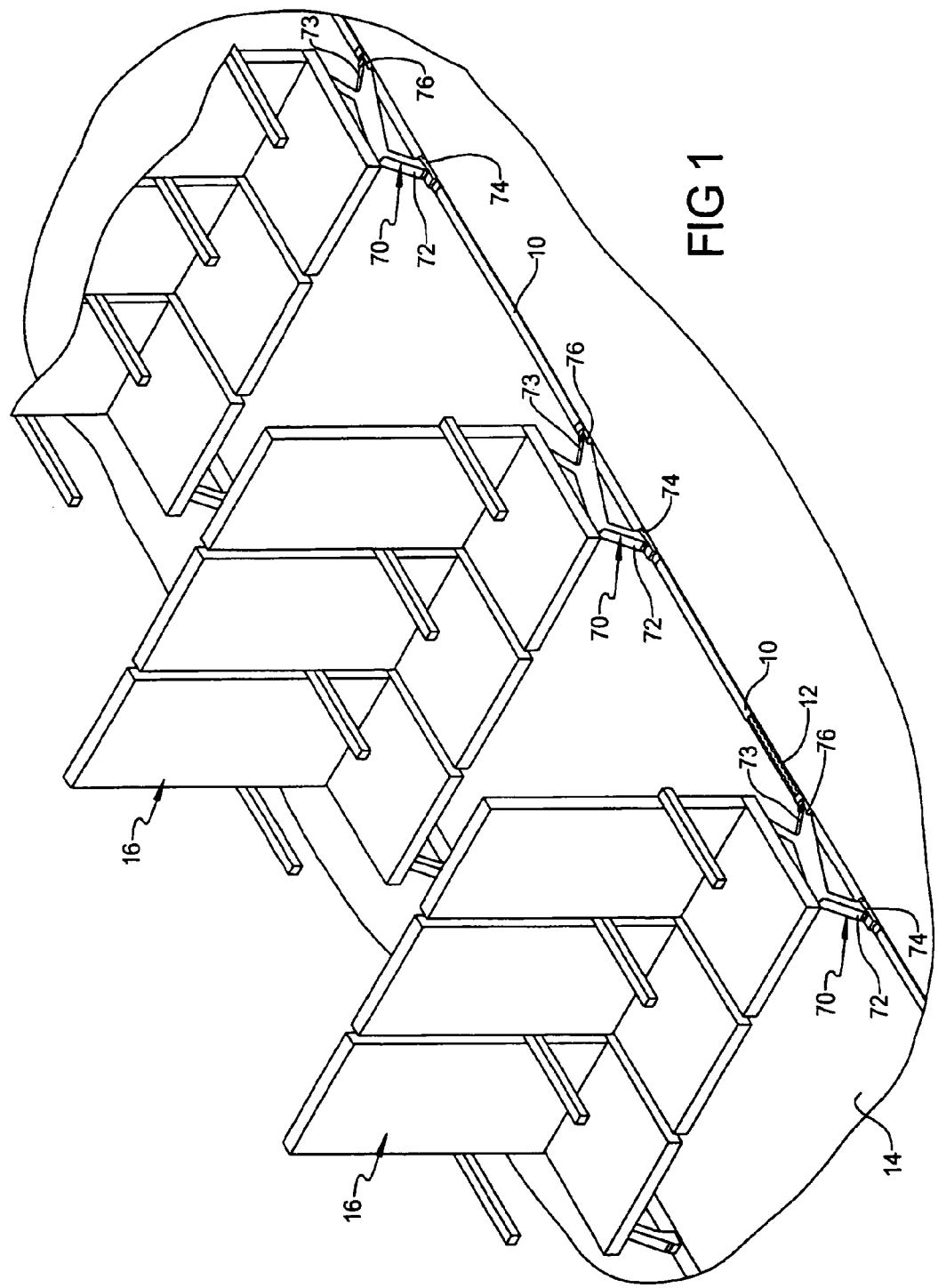
FIG. 1 is a perspective view of aircraft passenger seat groups each connected by a seat track cover according to the present invention.

With initial reference to FIG. 1, a number of seat track covers according to a preferred embodiment of the present invention are illustrated at 10. The seat track covers 10 are illustrated as extending along a seat track 12. The seat track 12 is recessed within an aircraft passenger cabin floor 14 between aircraft passenger seat groups 16. However, it will be appreciated that the present invention is not limited to use in an aircraft passenger cabin, but can be implemented in any form of mobile platform, such as a ship, train, bus, motorcraft, etc. as well as on any stationary platform, such as in theatre seats and stadium seats.

With additional reference to FIG. 2, the seat track cover 10 is generally an elongated strip having a length that is greater than its width. The seat track cover 10 generally includes a top portion 18, a housing 20, and first and second flanges 22A and 22B. The top portion 18 is located above the housing 20 and the flanges 22 extend from a bottom of the housing 20. The top portion 18 is wider than the width of the housing 20 and preferably has an arcuate surface contour.

The housing 20 extends the length of the top portion 18. The housing 20 defines a channel or through hole 24 that extends the entire length of the cover 10. The through hole 24 terminates to form a first opening 26 at a first end 28 of the housing 20 and a second opening (not shown) at a second end 30 of the housing 20, the first opening 26 being substantially similar to the second opening. The channel 24 can also take the form of a tube.

The flanges 22A and 22B extend downward from the housing 20. The flanges 22 terminate in a first tab 32A and a second tab 32B respectively. Each of the tabs 32A and 32B are slightly wider than the flanges 22. At least a portion of the flanges 22 are flexible to permit movement of the flanges 22 during installation.

With additional reference to FIG. 3, an electrical and/or optical cable according to a preferred embodiment of the present invention is illustrated at 34. The cable 34 is illustrated as a ribbon cable having a flexible wire portion 36. The wire portion 36 terminates in a first connector 38 at a first end and a second connector 40 at a second end. While the cable 34 is illustrated and described as a flat wire cable, the cable 34 can be any type of suitable conductor for conducting power and/or data. For example, the cable 34 can be a flat wire cable, a fiber optic cable, or one or more coaxial cables.

As illustrated in FIG. 3, both the first and second connectors 38 and 40 include a body 42 and one or more electrical/optical contacts 44 (not shown for the second connector 40) disposed within the body 42. The contacts 44 permit electrical and/or optical coupling between the cable 34 and other devices. The first and second connectors 38 and 40 include one or more mounting details 46. In some embodiments, the first and second connectors 38 and 40 can include annular recesses 47 that are proximate to the contacts 44. The first and second connectors 38 and 40 also each include locking receptacles 49. The receptacles 49 are illustrated as "U" shaped trays, but can be any suitable shape or device to cooperate with a corresponding locking tab, as described below. The receptacles 49 each include locking surfaces 51 that cooperate with the locking tab to lock the receptacle 49 and the locking tab together. The locking surface 51 can protrude from the receptacles 49, can be recessed within the receptacles 49, or can be of any suitable shape or configuration to effectuate a locking relationship between the receptacle 49 and the locking tabs. The first and second connectors 38 and 40 can be substantially identical, as illustrated, or can be of various different sizes and shapes.

Figures 4, 5:
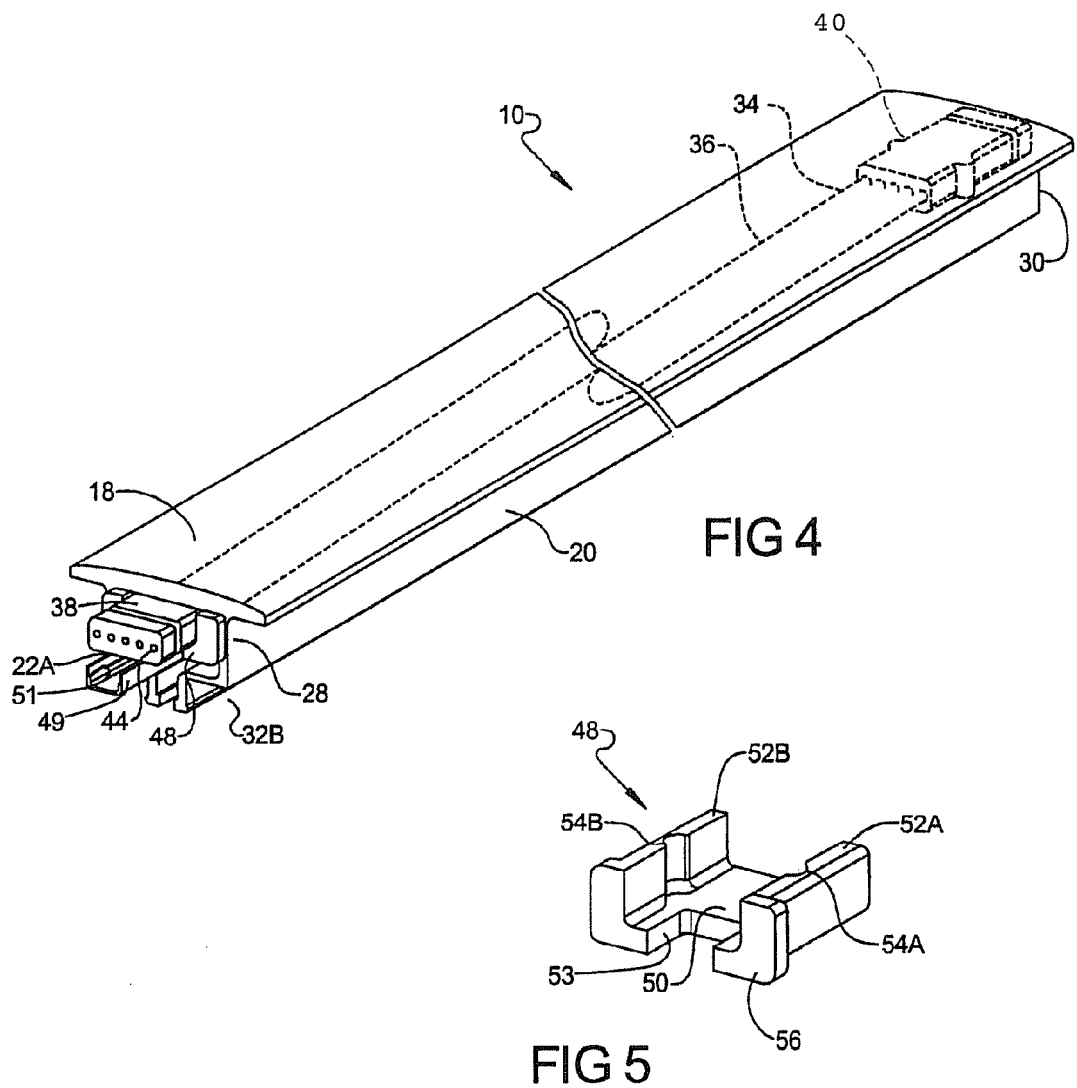
FIG. 4 is an assembled view of the seat track cover of FIG. 1 including the cable of FIG. 3.
FIG. 5 is a side perspective view of a connector mount used to secure the cable within the cover.

With additional reference to FIG. 4, the cover 10 is shown assembled with the cable 34 extending through the cover 10. The cable 34 is seated within the housing 20 such that the first connector 38 is seated at the first end 28 of the housing 20 and the second connector 40 is seated at the second end 30 of the housing. Both the first connector 38 and the second connector 40 are mounted to the first end 28 and the second end 30 respectively by a connector mount 48, described in greater detail below. The wire portion 36 of the cable 34 is at least the length of the cover 10 and may be substantially greater than the length of the cover 10. As illustrated in FIG. 4, excess length of the wire portion 36 is coiled or folded upon itself within the housing 20. Therefore, the cable 34 can be of any reasonable length equal to or greater than the cover 10 and the length of the cable 34 does not need to be limited to the length of the cover 10.

With additional reference to FIG. 5, the connector mount 48 includes a base 50, two sidewalls 52A and 52B extending vertically from the base 50, a pair of notches 54A and 54B located in each of the sidewalls 52 and sized to receive the mounting details 46 of the first and second connectors 38 and 40, and an end flange 56. The base 50 includes a gap portion 53 to accommodate the receptacle 49.

Installation of the cable 34 within the cover 10 will now be described. The cable 34 is inserted within the through hole 24 through either the first opening 26 or the second opening. Because the first and second connectors 38 and 40 are smaller then both the first end 28 and the second end 30, they can easily pass through both the first and second end 28 and 30. With the flexible wire portion 36 of the cable 34 within the through hole 24, the first and second connectors 38 and 40 are extended out from within the first end 28 and the second end 30 respectively so that they can each mate with one of the connector mounts 48.

The first connector 38 mates with the connector mount 48 in the same way that the second connector 40 does. Therefore, the below description of the installation of the first connector 38 at the first end 28 also applies to the installation of the second connector 40 at the second end. The first connector 38 mates with the connector mount 48 such that the first connector 38 is seated on the base with the mounting details 46 seated within the notches 54 to secure the first connector 38 to the connector mount 48 and with the receptacle 49 seated within the gap portion 53. The connector mount 48 is next seated at the first end 28 such that the sidewalls 52 are positioned within the first end 28 of the housing 20 and the end flange 56 abuts an outer portion of the first end 28 of the housing 20. The connector mount 48 is secured in position using any suitable mechanical and/or chemical fastening device or system. For example, the sidewalls 52 can be glued within the housing 20. Further, if the size of the housing 20 is smaller than the size of the connector mount 48, the connector mount 48 can be wedged within the housing 20 with the friction between the housing and the connector mount 48 securing the connector mount 48 in place.

FIGS. 6A and B illustrate an alternative embodiment of the cover 10 at 10'. Because the cover 10' includes many of the same features of the cover 10, the common features are designated with the same reference numbers as those in FIG. 2 but include the prime (') symbol. The above description of these common features equally applies to the cover 10'. Unlike the cover 10, the cover 10' includes a slot 60. The slot 60 is formed within a base 62 of the through hole 24' and extends the entire length of the through hole 24'. The through hole 24' of the cover 10' further includes openings 64 at both the first end 28' and the second end 30'.

With additional reference to FIGS. 7 and 8, a cable 34' is illustrated apart from and installed within the cover 10'. The cable 34' is substantially similar to the cable 34 and therefore, the above description of the cable 34 equally applies to the cable 34' and the common features are illustrated using the same reference numbers, but with the prime (') symbol. The only difference between the cable 34' and the cable 34 is that the first and second connectors 38' and 40' of the cable 34' are slightly larger so that the details 46' can mate with the openings 64 and so the connectors 38 and 40 substantially fill the through hole. Further, although the cable 34' as illustrated does not include the receptacle 49, the cable 34' can also include the receptacles 49.

During installation of the cable 34' within the cover 10', the wired portion 36' is inserted through the slot 60. The first and second connectors 38' and 40' are then inserted within the first and second ends 28' and 30'. The details 46' cooperate with the openings 64 to lock the first and second connectors 38' and 40' into position at the first and second ends 28' and 30' respectively. Use of the connector mount 48 is not necessary with the cover 10' and the cable 34'. The assembled cover 10' including the cable 34' is illustrated in FIG. 8.

With continued reference to FIG. 1, each of the seat groups 16 include at least one seat leg assembly 70. Each seat leg assembly 70 includes a front seat leg 72 and a rear seat leg 73. The front seat leg 72 includes a front connector assembly 74 and the rear seat leg 73 includes a rear connector assembly 76.

With additional reference to FIG. 9, the front connector assembly 74 according to one preferred embodiment of the present invention will now be described in detail. The front connector assembly 74 is generally secured to the front leg 72 at one end and includes a coupler portion 78 at another end. The coupler portion 78 can potentially be configured to rotate about a pivot point A (FIG. 10), slide, or actuate in any other manner to facilitate connection with the cover 10.

The front connector assembly 74 is secured to the front leg 72 using a fastener 80, which allows the front connector assembly 74 to rotate or pivot about the front leg 72 between an upward position (FIG. 9) and a downward or operable position (FIG. 11). The coupler portion 78 includes a connector 82 designed to mate with the contacts 44 of the cable 34. The connector 82 communicates power and/or data to and from the seat group 16 where such power and/or data can be utilized by passengers and crew using various electronic systems such as laptop computers, audio and video systems, and various other personal electronic devices.

The coupler portion 78 of the front connector assembly 74 further includes a seal 84. The seal 84 extends around the inner circumference of the coupler portion 78. The seal 84 can be made of any suitable material, such as a rubber or polymeric material. In many applications the seal 84 is impermeable to water. The seal 84 is seated within a depression that is formed within the coupler portion 78.

With reference to FIG. 12, the rear connector assembly 76 is illustrated in greater detail. The rear connector assembly 76 includes numerous features that are in common with the front connector assembly 74. The features of the rear connector assembly 76 that are also included in the front connector assembly 74 are designated by the same reference numerals, but also include the prime (') symbol. The above description of these common elements in relation to the front connector assembly 74 also applies to the rear connector assembly 76. Unlike the coupler portion 78 of the front connector assembly 74, the coupler portion 78' of the rear connector assembly 76 includes a tab 86 having a boss 87. As illustrated, the tab 86 is a flexible tab that extends from the coupler portion 78' towards the front seat leg 72. The tab 86 is sized to mate with the receptacle 49 (FIG. 3) of the cable 34 so that cooperation between the boss 87 and the locking surface 51, as described below, secures the cable 34 to the rear connector assembly 76.

With additional reference to FIG. 13, installation of the cover 10 between two of the aircraft passenger seat groups 16 to provide a connection between the front connector assembly 74 of one of the seat groups 16 and the rear connector assembly 76 of another one of the seat groups is illustrated. Installation of the cover 10' is substantially similar to installation of the cover 10 and the description of the installation of the cover 10 also applies to the cover 10'.

Figure 10:
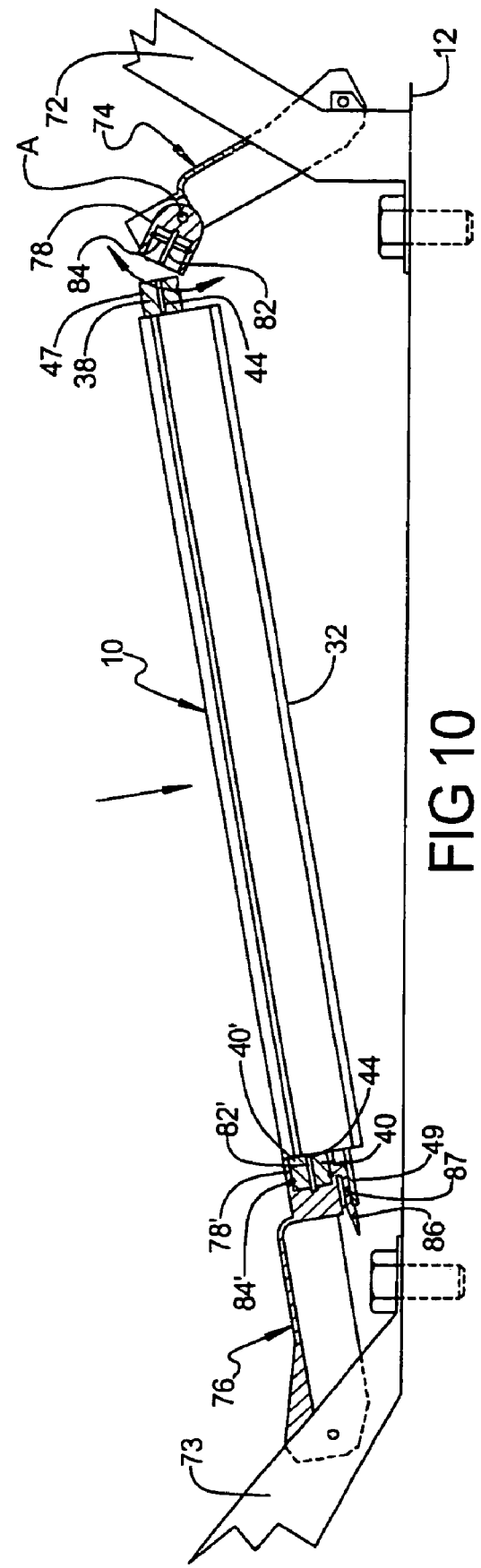
FIG. 10 is a pre-installation side view, in partial cross-section, of the seat track cover of FIG. 2 between the front connector assembly of FIG. 9 according to an additional embodiment and a rear connector assembly.

With reference to FIGS. 10, 11, and 13, installation of the cover 10 between two of the seat groups 16 in which one of the coupler portions 78 rotates is illustrated. As illustrated, in this embodiment the second connector 40 is first inserted into the rear connector assembly 76 with the rear connector assembly 76 in the upward position as described above. The second connector 40 is inserted within the coupler portion 78' such that connector 82' mates with the contact 44, the tab 86 mates with the receptacle 49, and the boss 87 passes over the locking surface 51 to secure the second connector 40 to the coupler portion 78'. In applications where the recess 47 is present, the seal 84' can mate with the recess 47 to provide a water tight connection. Alternatively, in applications where the recess 47 is not present, the seal 84' becomes compressed in the annular gap between the smooth outside of surface of connector 38 and the bore of the coupler 78 to provide a water tight connection.

Next, with the front connector assembly 74 in the upward position, the rotating coupler 78 is rotated down toward the seat track 12 to mate with the first connector 38 and to bring the connector 82 into contact with the contacts 44. The seal 84 mates with the recess 47 and/or becomes compressed in the annular gap between the smooth outside of surface of first connector 38 and the bore of rotating coupler 78 to provide a water-tight connection. The front connector assembly 74 is then rotated down toward the seat track 12 to cause further engagement between the rotating coupler 78 and the first connector 38. With reference to FIG. 11, once the front and rear connector assemblies 74 and 76 are moved to their lowered positions, the tabs 32 of the cover 10 are snapped into engagement with the seat track 12 to secure the cover 10 to the seat track 12. The absence of a feature similar to the tab 86 at the first connector 38 provides a less rigid connection between the first connector 38 and the coupler portion 78 than the connection between the coupler portion 78' and the second connector 40. Therefore, the connection between the first connector 38 and the coupler portion 78 can be made even if the cover 10 is slightly longer or shorter than the distance between the neighboring seat groups 16, thus providing a reasonable manufacturing tolerance.

With reference to FIG. 14, installation of the flexible cover 10 between two of the seat groups 16 is illustrated. Because the cover 10 is flexible in this embodiment, the cover 10 can be brought into contact with the front and rear connector assemblies 74 and 76 while the connector assemblies 74 and 76 are in the downward operable position by "inch-worming" the cover 10 between the connector assemblies 74 and 76 whereby the first connector 38 and the second connector 40 are bent downward to engage the connector assemblies 74 and 76 and then the middle portion of the cover 10 is pushed downward to contact the seat track 12.

With reference to FIG. 11, once the cover 10 is in contact with the front and rear connector assemblies 74 and 76, the tabs 32 of the cover 10 are locked to the seat track 12 to secure the cover 10 in position. Once installed, the cover 10 provides an electrical power and/or data connection between the front connector assembly 74 and the rear connector assembly 76 to transfer data and/or power from one seat group 16 to another. One of the seat groups 16 is typically in contact with a data and/or power source (not shown) using one of the covers 10 or any other suitable connection. Therefore, by connecting additional seat groups 16 to the seat group 16 that receives data and/or power from the data/power source using the cover 10, all of the connected seat groups 10 can be serially coupled to receive and/or transmit data and/or power between each other and the data/power source.

One of ordinary skill in the art will appreciate that installation of the cover 10 can be performed in a variety of different ways in addition to the manner described above. For example, instead of inserting the first connector 38 into the front connector assembly 74 first, the second connector 40 can be inserted within the rear connector assembly 76 first. Also, the orientation of the cover 10 can be reversed so that the second connector 40 mates with the front connector assembly 74. Still further, the cover 10 can be brought into contact with the front and rear connector assemblies 74 and 76 at the same time. Even further, the coupler portion 78 within front connector assembly 74 can be fixed while the coupler portion 78' within rear connector assembly 76 can pivot. Still further, top portion 18 may be substantially the same width as housing 20 and may have a flat shape to allow the top surface of the cover 10 to be flush with the floor 14 to allow, for example, carpet to cover the cover 10. Also, the coupler portion 78' of the front connector assembly 74 may also include a feature similar to the tab 86 to allow the first connector 38 to lock into the coupler portion 78, thus allowing both the first and second connectors 38 and 40 to both be locked to their respective connector assemblies.

Figure 15:
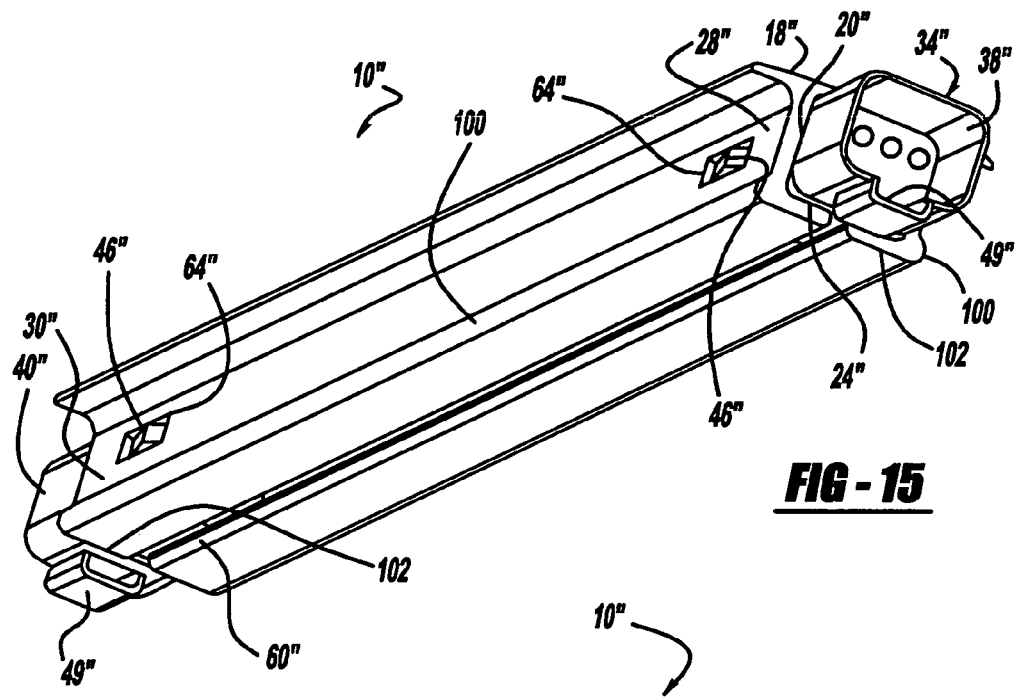
FIG. 15 is a perspective view of a seat track cover according to an additional embodiment of the present invention.

With reference to FIG. 15, an additional embodiment of the seat track cover 10 is illustrated at 10". Because the cover 10" includes many of the same features of the covers 10 and 10', the common features are designated with the same reference numbers as those in FIGS. 2 and/or 6, but include the double prime (") symbol. The above description of the common features equally applies to the cover 10".

Unlike the covers 10 and 10', the cover 10" includes engagement details 100 at both sides of a base portion 102 of the cover 10", which is opposite the top portion 18". The engagement details 100 can be of a variety of different types, shapes, and sizes. As illustrated, the details 100 are ribs that protrude from the base portion 102 and extend the entire length of the cover 10" from the first end 28" to the second end 30".

The cover 10" also includes a cable 34". The cable 34" is substantially similar to the cables 34 and 34'. Therefore, the common features of the different cables 34 are designated with the same references numbers used in FIGS. 3 and 7, with the features of the cable 34" including the double prime symbol ("). The above description of the common features equally applies to the cable 34".

The cable 34" is similar to the cable 34 in that it optionally includes the receptacles 49". The cable 34" also optionally includes the mounting details 46". The mounting details are optional because the connector portion of cable 34" can alternatively be held in place with a slight interference fit into the extruded track cover. The mounting details 46" engage the openings 64" of the cover 10" to secure the cable 34" within the cover 10". In most applications, the connectors 38" and 40" are of a size that approximates the interior of the housing 20", thus making use of the connector mount 48 (FIG. 5) unnecessary. However, the mount 48 can be used to support the connectors 38" and 40" in the housing 20" if necessary.

Figure 16A:
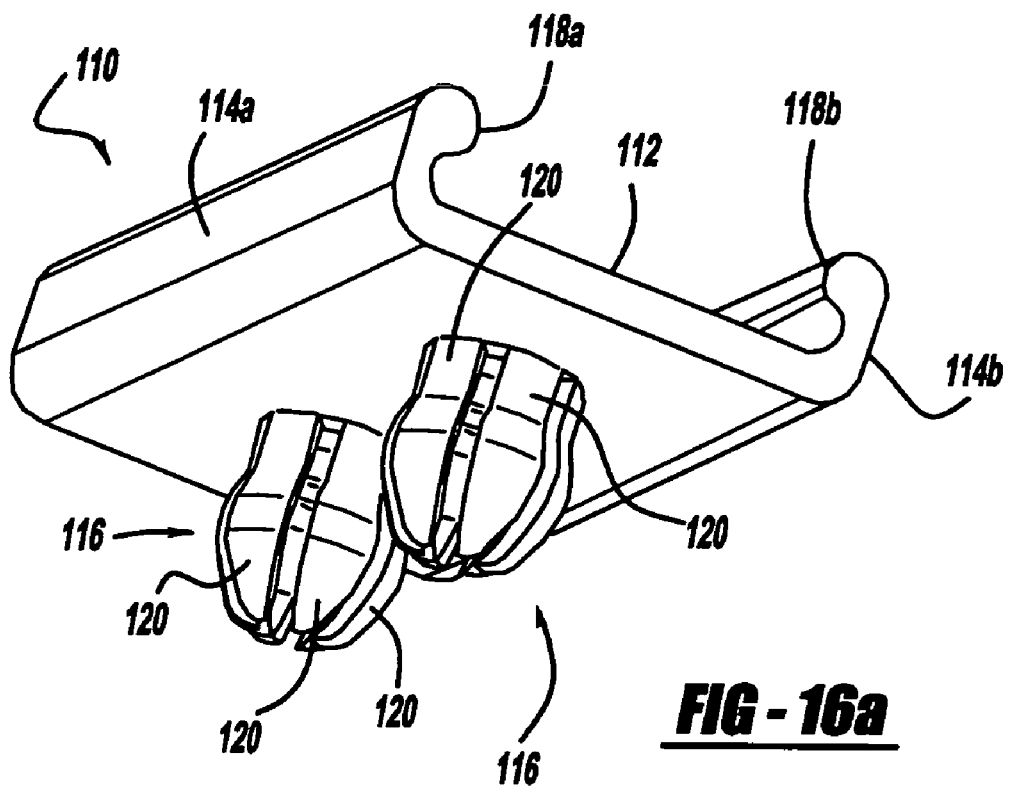
FIGS. 16a and 16b are perspective views of a mounting device of the present invention.
Figure 16B:
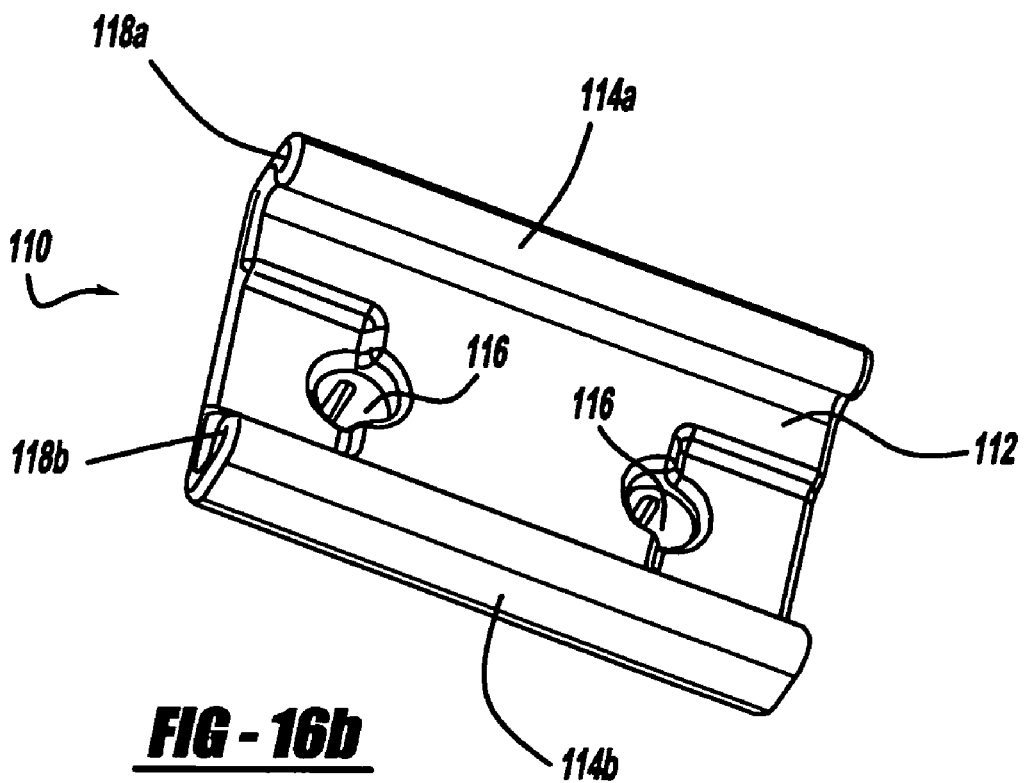

With additional reference to FIG. 16, the present invention further includes a mounting device 110. The mounting device 110 generally has a base portion 112, a pair of side walls 114a and 114b, and at least one mounting boss or cleat 116.

Each of the side walls 114a and 114b extend from opposite sides of the base 112 and are at least substantially parallel to each other. The side walls 114 together with the base 112 form a generally "U" shaped receptacle. Each of the side walls 114 include an engagement detail 118a and 118b. The engagement details 118 can be any of a variety of suitable engagement features or devices known in the art. As illustrated, the details 118a and 118b are ribs that extend inward toward each other.

The mounting cleats 116 extend from a side of the base 112 that is opposite to the side of the base 112 that the side walls 114 extend from. Each cleat 116 includes a plurality of fingers 120. The fingers 120 are flexible and can move between a contracted position and an expanded position. In the contracted position the fingers 120 are biased close together. In the expanded position (i.e., resting or unbiased position) the fingers 120 are further apart as compared to the contracted position. Therefore, the fingers 120 can contract to pass through an engagement feature, such as an aperture, and then expand to secure the cleat within the engagement feature. The cleats 116 can take the form of any suitable deformable, deflectable mounting feature in addition to the design illustrated. Further, the mounting device 110 can include any suitable number of the cleats 116, which will depend in part on the overall length of the cover 10".

Figure 18:
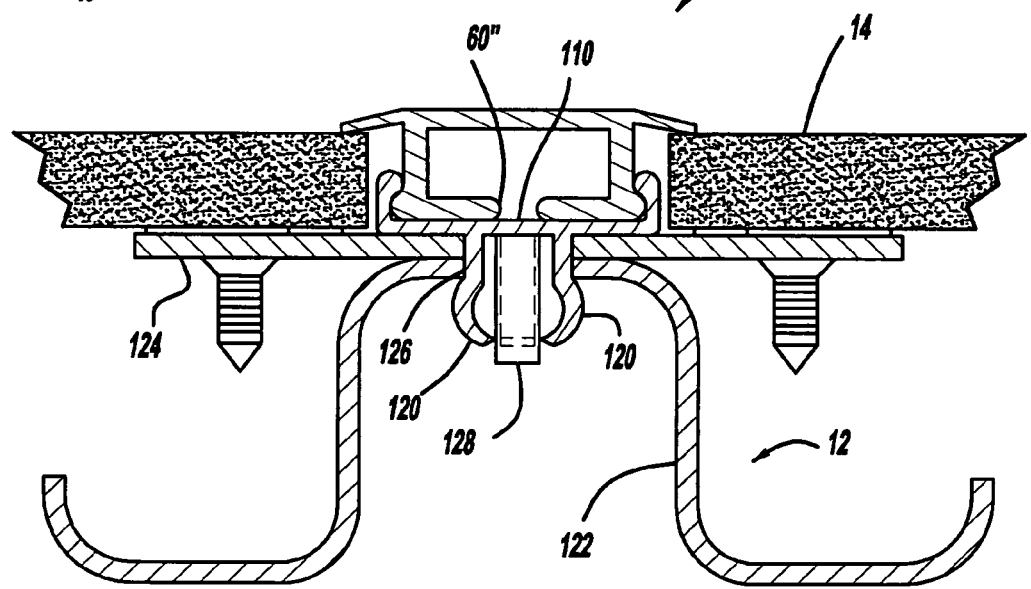
FIG. 18 is a cross-sectional view of the seat track cover of FIG. 15 secured to the seat track by way of the mounting device of FIG. 16.
Figure 17:
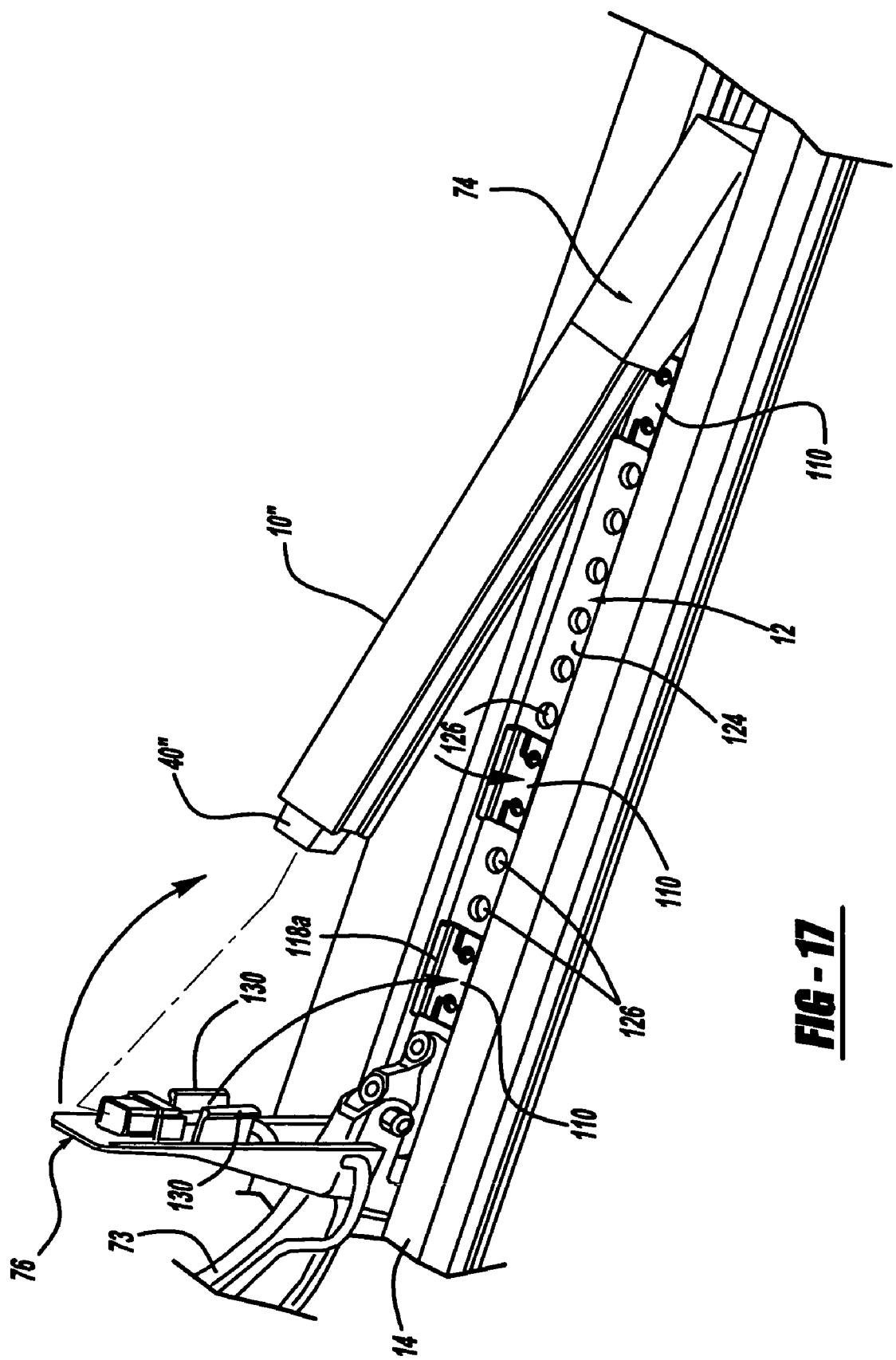
FIG. 17 is a perspective view of the installation of the seat track cover of FIG. 15 between two seat leg connector assemblies.

With additional reference to FIGS. 17 and 18, the seat track 12 includes a main body 122 and a mounting platform 124 that is supported atop the main body 122. The mounting platform 124 is generally planar and includes a plurality of mounting features 126, which are illustrated as round apertures or openings. However, the mounting features 126 can be of any shape, size, or configuration. The mounting platform 124 also includes mounting locations to receive fasteners for securing the seat track 12 to the passenger cabin floor 14.

With continued reference to FIGS. 17 and 18, installation of the seat track cover 10" between the front seat leg 72 and the rear seat leg 73 will now be described. As illustrated in FIG. 17, the mounting device 110 is first secured to the seat track 12. Specifically, the mounting cleats 116 of the device 110 are inserted through the apertures 126 of the seat track 12. As the cleats 116 are pushed through the apertures 126 the flexible fingers 120 of each cleat 116 contract to permit passage of the cleats 116 through the apertures 126. After the cleats 116 pass through the apertures 126, the fingers 120 return to their expanded position to secure the mounting device 110 to the seat track 12, as illustrated in FIG. 18.

With reference to FIG. 18, to help retain the flexible fingers 120 in the expanded position and prevent the mounting device 110 from becoming detached from the track 12, a locking pin 128 can be inserted through the middle of the cleats 116. The locking pin 128 prevents the fingers 120 from bending inward and moving to the contracted position, which could allow the cleats 116 to pass through the apertures 126 to detach the mounting device 110 from the seat track 12.

With reference to FIG. 17, the cover 10" is mounted to the front and rear connector assemblies 74 and 76 in the same manner as is described above in the description accompanying FIGS. 10 through 14. Therefore, the above description of the installation of cover 10 equally applies to the installation of the cover 10". The only difference is that the cover 10" is not secured directly to the seat track 12 or the floor 14, but rather is secured to the mounting device 110. Specifically, the ribs 100 pass over the ribs 118 to secure the cover 10 to the mounting device 110 with a "snap fit" like attachment.

While the mounting device 110 is described as being secured to the seat track 12 before the cover 10" is secured to the mounting device 110, in some applications the mounting device 110 can first be secured to the cover 10" before being secured to the seat track 12.

In some applications the cleats 116 can be integral with the cover 10", thus eliminating the need for the mounting device 110 as a separate part. This simplifies installation by eliminating the number of steps involved and reduces the need to keep additional parts in inventory.

As illustrated in FIG. 17, the mounting device 110 can also be used to secure the connector assemblies 74 and 76 in the downward position in which they are parallel to the seat track 12. Specifically, the connector assemblies 74 and 76 can each include an engagement clip 130 having details that are each similar to the details 100 of the cover 10". Therefore, the mounting device 110 can be secured to the seat track 12 under the clips 130 of the connector assemblies 74 and 76 such that when the connector assemblies 74 are rotated into the downward position, the clips 130 interlock with the details 118 of the cover 10" and secure the connector assemblies 74 and 76 in the downward position to prevent undesired disengagement between the assemblies 74 and 76 and the cover 10".

Figure 19A:
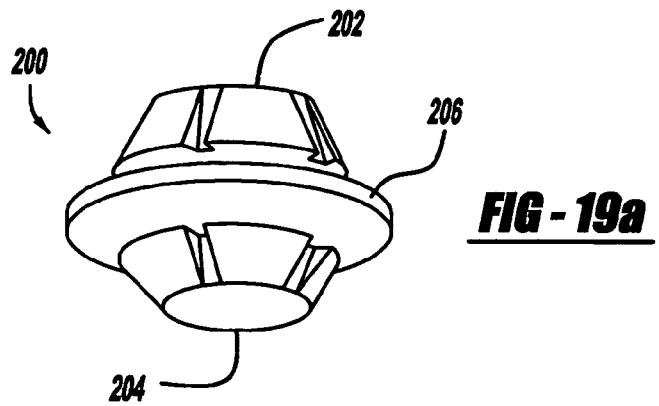
FIG. 19a is a perspective view of a mounting peg according to another embodiment of the present invention.
Figure 19B:
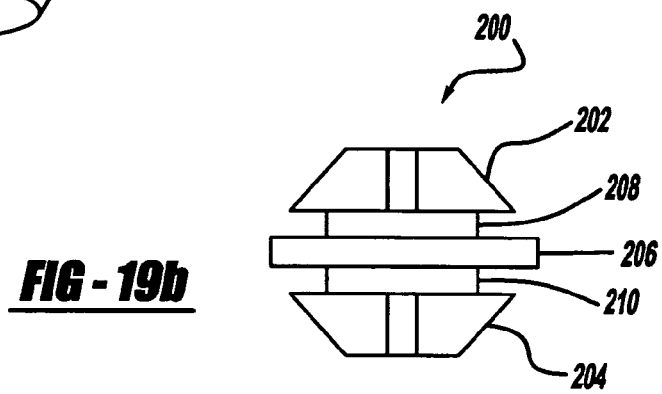

With additional reference to FIG. 19, in some embodiments the mounting device 110 can be replaced by, or supplemented with, a mounting device taking the form of a mounting peg 200. The peg 200 generally includes a first knob 202 and a second knob 204, each of which can function as engagement details. The first knob 202 and the second knob 204 are each connected to a base portion 206, which is between the first and second knobs 202 and 204.

Each knob 202 and 204 is connected to the base portion 206 by recessed portions 208 and 210 respectively. Each knob 202 and 204 is generally tapered outward in the direction of the base portion 206. Therefore, each knob 202 and 204 in combination with their respective recessed portions 208 and 210 generally forms a "Christmas Tree" type fastener.

The knob portions 202 and 204 are generally flexible or deformable. The knob portions 202 and 204 can be made of any suitable flexible or deformable material known in the art, such as a suitable polymer or rubber.

The installation process of the peg 200 is generally the same as the installation process of the mounting device 110. Therefore, the installation process of the mounting device 110 described above equally applies to the peg 200.

Figure 20:
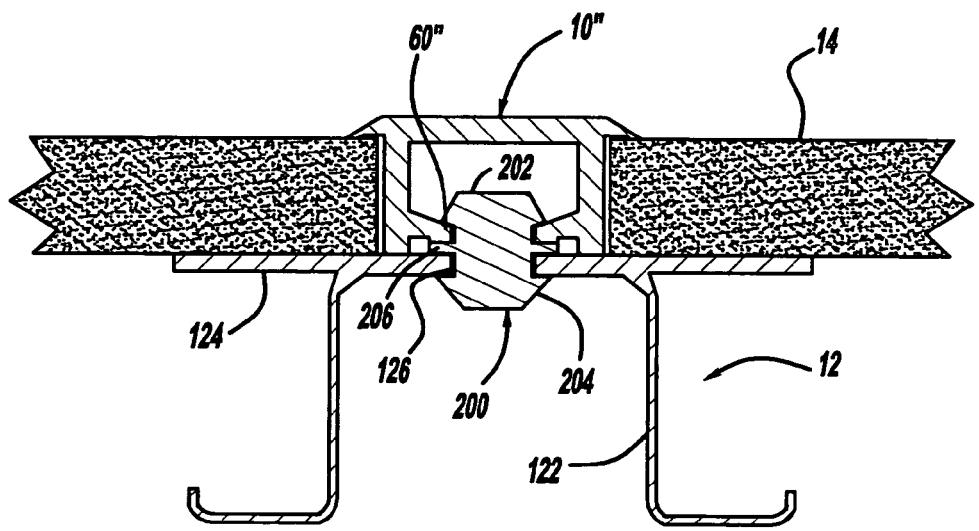
FIG. 20 is a cross-sectional view showing the mounting peg of FIG. 19 installed between a seat track cover and a seat track to couple the seat track cover to the seat track.

FIG. 20 illustrates the peg 200 as installed to secure the cover 10" in position. As illustrated, the knob 202 is inserted within the slot 60" of the seat track cover 10" such that the portion of the cover 10" defining the slot 60" is seated at the recessed portion 208, between the knob 202 and the base portion 206. This interaction secures the peg 200 to the cover 10".

Similarly, the knob 204 is inserted within the mounting feature 126 of the seat track 12 such that the sidewalls of the mounting feature 126 are seated at the recessed portion 210, between the knob 204 and the base portion 206, to secure the peg 200 to the seat track 12. This cooperation between the peg 200 and the seat track 12 secures the cover 10" in position because the cover 10" is also secured to the peg 200.

While the peg 200 is illustrated and described as being orientated such that the knob 202 cooperates with the cover 10" and the knob 204 cooperates with the seat track 12, this orientation can be reversed so that the knob 202 cooperates with the track 12 and the knob 204 cooperates with the cover 10". Further, the peg 200 need not be a separate part, but can be integral with either the cover 10" or the seat track 12.

Therefore, the present invention provides for a seat track cover 10" that can be secured to a seat track 12 having a planar mounting platform 124 by way of a mounting device, such as the device 110 and/or the peg 200. The mounting device 110 and the peg 200 serve as an adaptor that couples the seat track cover 10" to the seat track 12. Use of the mounting device 110 and/or the peg 200 eliminates the need to use a C-shaped, floor mounted seat track, and enables a simpler, planar seat mounting track with spaced apart holes to be employed.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A system for communicating at least one of power and data between two spaced apart seat assemblies comprising:
   a seat track cover including a first engagement detail and a plurality of mounting structures formed in a wall portion of said seat track cover;
   a cable having a connector at each end thereof, each said connector being dimensioned to fit at least partially within an interior area of said seat track cover and including at least one mounting detail, said mounting detail of each said connector being adapted to engage with an associated one of said mounting structures when said connector is slidably inserted into an associated end of said seat track cover to hold said connector in a predetermined position relative to said seat track cover;
   a seat track mount including:
      a second engagement detail; and
      a third engagement detail; and
   a seat track including an opening;

wherein said first engagement detail engages said second engagement detail to secure said cover to said mount; and wherein said third engagement detail engages said seat track opening to secure said mount to said seat track.

2. The system of claim 1, wherein said first engagement detail includes a protruding rib that extends along a base portion of said seat track cover.

3. The system of claim 2, wherein said second engagement detail includes a pair of parallel, ribbed side walls having a shape and size that permits secure cooperation between said first engagement detail and said second engagement detail.

4. The system of claim 1, wherein said third engagement detail includes a mounting cleat having a plurality of flexible fingers operable to move between an expanded position and a contracted position;

wherein said flexible fingers can be moved to said contracted position to permit passage of said cleat through said receptacle and moved to said expanded position to secure said cleat within said receptacle.

5. The system of claim 4, further comprising a locking pin operable to be inserted between said fingers to retain said fingers in said expanded position to prevent removal of said engagement detail out of engagement with said opening.

6. The system of claim 1, wherein said cable comprises a conductive cable housed within said interior area of said seat track cover and extending across a length of said cover to communicate at least one of the data and power between said connectors.

7. The system of claim 1, wherein said seat track further includes a planar portion having said opening.

8. The system of claim 7, wherein said opening forms a substantially circular hole in said planar portion.

9. The system of claim 1, wherein said seat track mount includes a mounting peg.

10. The system of claim 9, wherein said mounting peg includes a first deformable knob operable to engage said seat track cover and a second deformable knob operable to engage said seat track.

11. A system for communicating at least one of power and data between two spaced apart seat assemblies comprising:

a seat track having an opening;

a seat track cover having a plurality of mounting structures formed in a wall portion of said seat track cover;

a cable having a connector at each end thereof, each said connector being dimensioned to fit at least partially within an interior area of said seat track cover and including at least one mounting detail, said mounting detail of each said connector being adapted to engage with an associated one of said mounting structures when said connector is slidably inserted into an associated end of said seat track cover to hold said connector in a predetermined position relative to said seat track cover;

a seat track mount including:
    a base;
    a pair of spaced apart parallel sidewalls extending in a first direction from said base that form a "U" shaped receptacle with said base; and
    an engagement pin extending from said base in a second direction that is opposite to said first direction;

wherein said mount is operable to fixedly receive said seat track cover between said side walls; and wherein said engagement pin cooperates with said seat track opening to fixedly secure said mount to said seat track.

12. The system of claim 11, wherein said seat track cover further includes an engagement rib, said engagement rib cooperating with said sidewalls of said mount to secure said cover to said mount.

13. The system of claim 11, wherein each of said sidewalls include engagement details in the form of elongated ribs.

14. The system of claim 11, wherein said engagement pin includes a mounting cleat having a plurality of flexible fingers operable to move between an expanded position and a contracted position;

wherein said flexible fingers can be moved to said contracted position to permit passage of said cleat through said opening and moved to said expanded position to secure said cleat within said opening.

15. The system of claim 14, further comprising a locking pin operable to be inserted between said fingers to retain said fingers in said expanded position to prevent removal of said engagement detail from engagement with said receptacle.

16. The system of claim 11, wherein said cable comprises a conductive cable which is housed within said seat track cover and which extends across a length of said cover to communicate at least one of the data and power across said seat track cover.

17. The system of claim 11, wherein said seat track further includes a planar portion comprising said opening and comprising mounting locations operable to receive a fastener for securing an aircraft passenger cabin floor to said seat track.

18. The system of claim 17, wherein said opening includes a substantially circular hole in said planar portion.

19. A method of mounting a seat track cover to a seat track between a first seat leg assembly and a second seat leg assembly comprising:

sizing a seat track cover to a length that approximates a distance between the first and second seat leg assemblies, and forming the seat track cover to have a plurality of mounting structures formed in at least one wall portion of said seat track cover;

providing a cable having a connector at each end thereof, each said connector being dimensioned to fit at least partially within an interior area of said seat track cover;

forming each said connector with at least one mounting detail, said mounting detail of each said connector being adapted to engage with an associated one of said mounting structures when said connector is slidably inserted into an associated end of said seat track cover to hold said connector in a predetermined position relative to said seat track cover;

securing a seat track mount to the seat track through cooperation between a first engagement detail of a first side of the mount and a receptacle of the seat track;

securing the seat track cover to a first seat leg assembly;

securing the seat track cover to the seat track mount through cooperation between a second engagement detail of the seat track cover and a third engagement detail of a second side of the seat track mount that is opposite the first side of the mount; and securing the seat track cover to the second seat leg assembly to provide a connection between the first and second seat leg assemblies.

20. The method of claim 19, wherein said housing is a flexible housing and said method further comprises bending the seat track cover to position the cover between the first and second seat leg assemblies.

21. The method of claim 20, further comprising contracting flexible fingers of the first engagement detail to permit passage of said first engagement detail through the receptacle of the seat track and expanding the flexible fingers after the first engagement detail has passed through the receptacle to secure the engagement detail within the receptacle.

22. The method of claim 21, further comprising inserting a locking pin between the flexible fingers after the first engagement detail is inserted through the receptacle to retain the fingers in the expanded position and prevent the engagement detail from being removed from the receptacle.

23. The method of claim 17, further comprising securing a first deformable knob of said seat track mount to said seat track cover and securing a second deformable knob of said seat track mount to said seat track.

24. A system for communicating at least one of power and data between two spaced apart seat assemblies comprising:
 a seat track having an opening;
 a seat, track cover having a plurality of mounting structures formed in a wall portion of said seat track cover; and
 a cable having a connector at each end thereof, each said connector being dimensioned to fit at least partially within an interior area of said seat track cover and including at least one mounting detail, said mounting detail of each said connector being adapted to engage with an associated one of said mounting structures when said connector is slidably inserted into an associated end of said seat track cover to hold said connector in a predetermined position relative to said seat track cover;
 a seat track mount including:
  a base portion;
  a first knob extending from a first side of said base portion; and
  a second knob extending from a second side of said base portion opposite said first side;
  wherein said first knob cooperates with said seat track cover to secure said mount to said seat track cover; and
  wherein said second knob cooperates with said seat track to secure said mount to said seat track.

25. The system of claim 24, wherein said first knob and said second knob are deformable.

26. The system of claim 24, wherein each of said first knob and said second knob comprise at least one of an elastomer and a polymer.

27. The system of claim 24, wherein said cable comprises a conductive cable housed within said seat track cover, said cable extending across a length of said cover to communicate at least one of the data and power between said connectors.

28. The system of claim 24, wherein said seat track further includes a planar portion comprising said opening and comprising mounting locations operable to receive a fastener for securing an aircraft passenger cabin floor to said seat track.

29. The system of claim 24, wherein said opening includes a substantially circular hole in said planar portion.

* * * * *